Jan. 20, 1959 W. C. SCHMIDT 2,869,842
SELF LOCKING AGITATOR ASSEMBLY
Filed May 31, 1956 2 Sheets-Sheet 1

INVENTOR.
WILLIAM C. SCHMIDT
BY
J. Warren Kinney Jr.
ATTORNEY

Jan. 20, 1959 W. C. SCHMIDT 2,869,842
SELF LOCKING AGITATOR ASSEMBLY
Filed May 31, 1956 2 Sheets-Sheet 2
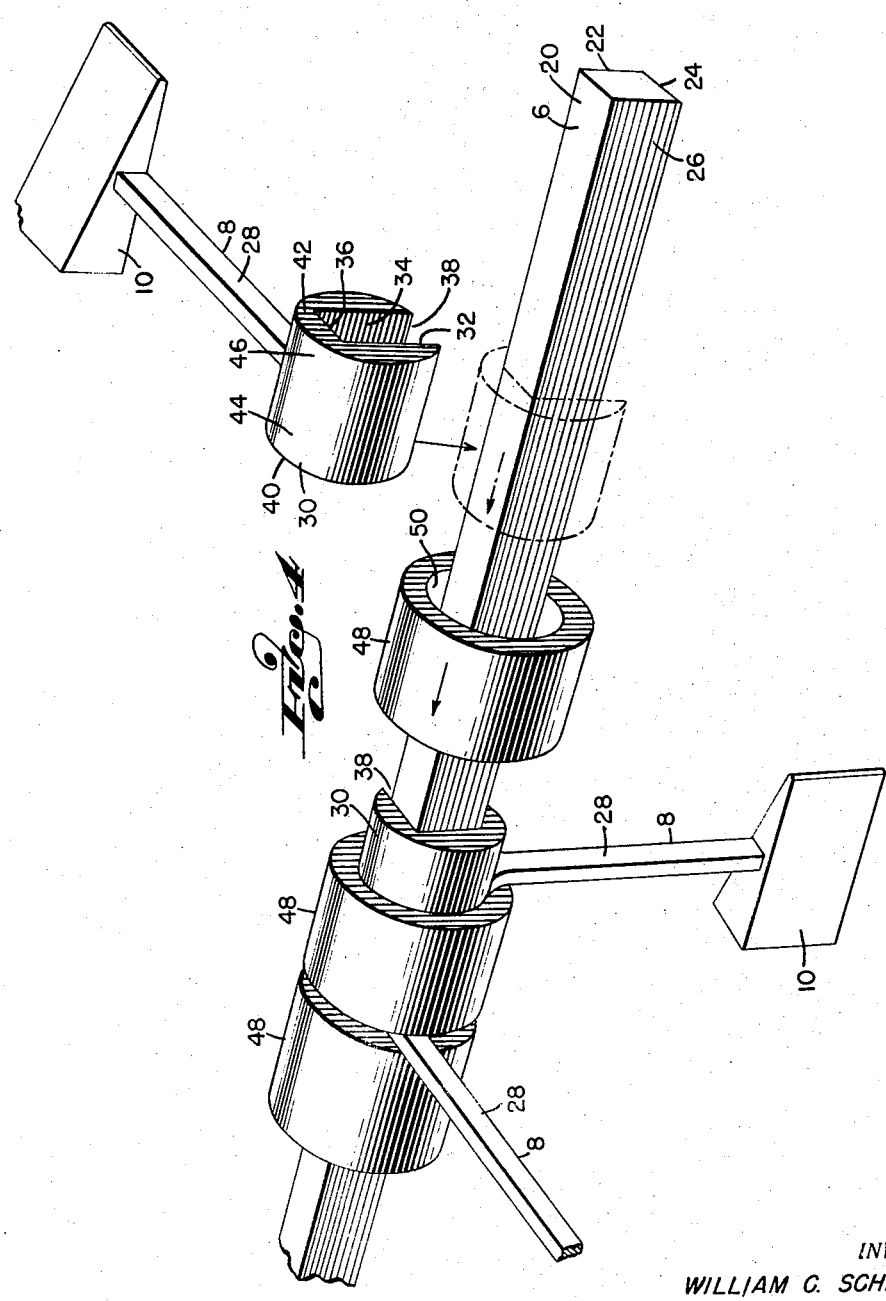
INVENTOR.
WILLIAM C. SCHMIDT
BY
J. Warren Kinney Jr.
ATTORNEY

United States Patent Office 2,869,842
Patented Jan. 20, 1959

2,869,842
SELF LOCKING AGITATOR ASSEMBLY

William C. Schmidt, Cincinnati, Ohio, assignor to The Cincinnati Butchers' Supply Company, Cincinnati, Ohio, a corporation of Ohio Application May 31, 1956, Serial No. 588,321

12 Claims. (Cl. 259—109)

The present invention relates to a self-locking agitator assembly, and more specifically to means for mounting agitating elements upon a driving shaft without resort to screws, bolts or similar conventional fasteners.

An object of the invention is to provide means for the mounting of agitating elements upon a shaft, with assurance that no parts will become loose or detached while performing an agitating function, with resultant injury to or destruction of the tank or vessel housing the agitating elements.

Another object of the invention is to facilitate and expedite the mounting or the replacement of agitator elements with relation to a drive shaft, with savings of labor, expense and costly shut-down time.

Another object is to achieve uniformity of agitator action in a mixer or related machine, by providing uniformity of agitator element spacing along a drive shaft, without depending upon accuracy of measurements and other factors involving possibilities of human error.

A further object is to minimize inspection costs and frequent servicing of agitating equipment, by eliminating those elements which heretofore failed in service or required periodic adjustment to ensure safe operation of the equipment.

The foregoing and other objects are attained by the means described herein and illustrated upon the accompanying drawings, in which:

Fig. 4 is a perspective view of an agitator shaft and co-operative agitating elements, showing the method of application and replacement of agitating elements upon the shaft.

It has been customary heretofore to detachably mount agitating elements upon the agitator shaft of a mixer or kindred machine, using bolts, screws or similar conventional fasteners as the securing means. Such fasteners invariably caused a great deal of concern in maintenance of the machines, due to liability thereof to loosen or break and release the agitating elements from the shaft, with damaging and sometimes hazardous results. A dangling or detached agitating element would sometimes entangle with others working inside the tank, and be forcefully thrust thereby through the tank wall to cause extensive and very costly damage. In the case of machines the tanks of which were steam-jacketed for cooking or rendering the contents of the tank, the danger was very pronounced, due to the possibility of tank puncture resulting in explosive release of steam under pressure onto workmen or attendants in the vicinity.

Efforts to avoid or reduce the occurrence of accidents such as those above mentioned, involved frequent shut-down and inspection of the machines, particularly with respect to the agitator mounts. Taking the machines out of service for inspection was not only costly, but impractical as well, particularly in the case of machines incorporating heated tanks, which could not be properly inspected until cooled sufficiently to permit inspection. With the means of the present invention incorporated in the structure, accidents and frequent inspections and shut-downs are effectively eliminated, with important savings, safety considerations, and other advantages taken fully into account.

Figure 1:
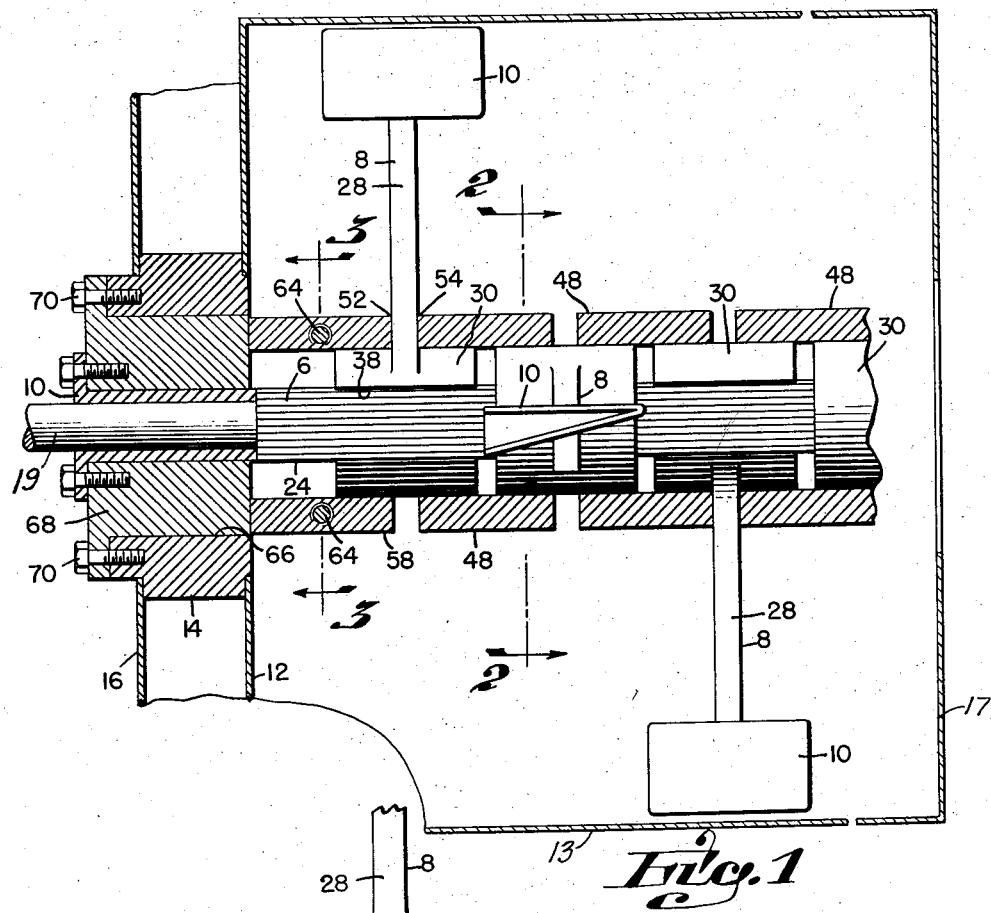
Fig. 1 is a longitudinal cross-sectional view of an agitator shaft journalled in an agitating tank end-bearing, and incorporating the means of the present invention for mounting of agitator elements upon the shaft.
Figure 2:
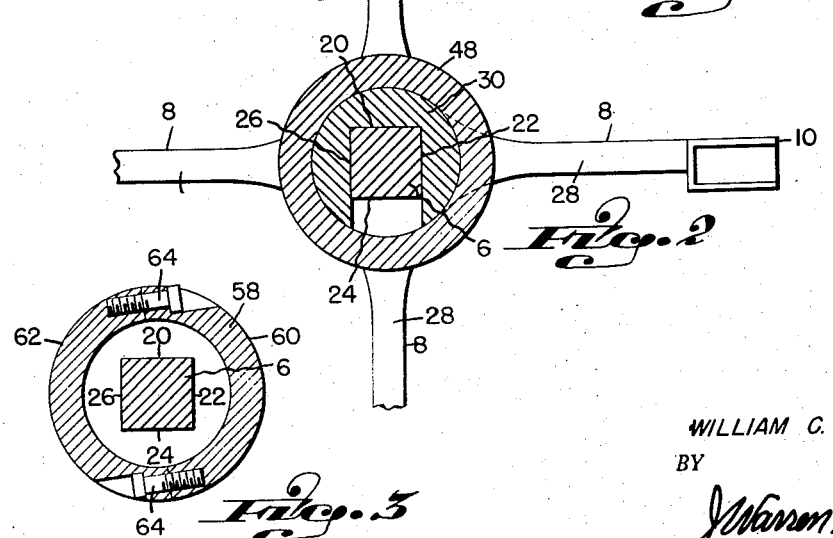
Fig. 2 is a cross-sectional view taken on line 2—2 of Fig. 1.

In the drawings, Fig. 1 shows an agitator assembly including a shaft 6 made square in cross-section and carrying a series of agitating elements or beaters denoted generally by the characters 8. The agitating elements may include working areas, herein shown by way of example as heads 10, which move in close proximity to a tank wall 13 as the shaft carrying the agitator elements is rotated. The tank usually is in the form of a long cylinder having end walls 12 and 17 which carry bearings 10, only one of which is shown, in which may rotate the turned ends 19 of the agitator shaft. Fig. 1 illustrates one of such bearings supported by a tank end wall 12 carrying a spacer 14 establishing a steam jacket between the wall 12 and an outer shell or jacket wall 16. All of the inner tank walls 12, 13 and 17 may be so jacketed, depending upon whether or not the inner tank is to be heated for cooking or rendering the material confined within the tank. In the case of a dry rendering cooker or similar equipment for processing animal waste and the like, the tank will be jacketed or otherwise equipped for heating the tank contents. In any event, the agitator shaft usually extends axially of the cylindrical tank, and is powered to move the working areas 10 of the agitating elements in close proximity to the inner wall of the tank.

The shaft 6 intermediate its bearing ends is angular in cross-section, that is, it may be square, hexagonal, or of any other geometric shape in cross-section. The shaft therefore may be characterized by a series of angularly related faces or facets 20, 22, 24 and 26, for example, extending lengthwise of the shaft intermediate the tank end walls. Each facet preferably is flat, and is bounded by well-defined corners or edges as shown.

The shaft is adapted to carry a series of agitating elements 8, the arms 28 of which project radially from the shaft at different angles (Fig. 4), and each agitating element is detachably mounted upon the shaft so as to be easily and quickly replaced when necessary. Such mounting of an agitating element is effected by providing it with a hub 30 whose outer surface preferably, though not necessarily, is cylindrical, and milled or otherwise channeled to produce a socket having interior flat walls 32, 34 and 36 so spaced and dimensioned as to receive the shaft as indicated by broken lines in Fig. 4. Between the interior walls 32 and 34 is a longitudinal opening or throat 38 through which the shaft passes laterally to reach a seating relationship upon the interior wall 36.

As will be understood, the interior walls of the hub socket are complementary to and will register with corresponding facets of the shaft, so that the hub may not rotate relative to the shaft when applied thereto. The hub socket walls are so dimensioned as to nicely fit the shaft, with tolerance permitting slidability of the hub along the polygonal section of the shaft. The agitator arm 28 is fixed to or integral with the hub 30, and by preference extends radially outwardly from a location midway between the ends 40 and 42 of the hub. The end margins 44 and 46 of the hub, at opposite sides of arm 28, preferably are cylindrical in form, to receive cylindrical sleeves or retainers as will be explained. The channel of the hub extends axially thereof, and is open at opposite ends of the hub as shown.

From the foregoing, it will readily be understood that any agitator element such as 8 may be quickly and easily hooked onto the shaft 6 at any location along its length, to ensure rotation thereof with the shaft. It is necessary, however, to provide means for precluding accidental displacement of the agitating elements from the shaft while the shaft is rotating, and for this purpose is provided a series of hub retainers 48 made preferably in the form of short cylindrical sleeves, Fig. 4, the axial bores 50 of which are dimensioned to snugly but slidably fit over the end margins 44 or 46 of the hubs. The sleeves, of course, fit very loosely about the shaft 6, but when slipped onto the ends of the hubs, said sleeves are stable and will effectively resist any tendency of the hub sockets to expand under heavy load imposed upon the agitator heads or arms by the material undergoing working within the tank. When assembled upon the hubs and the shaft, each retainer or sleeve 48 will embrace adjacent ends of two agitating element hubs, at opposite sides of an arm 28, as indicated upon Fig. 1. Opposite sides of any given arm 28 are abutted by the ends of two sleeves 48, as indicated at 52 and 54 of Fig. 1. The sleeves serve also as spacers between the hubs of a series of agitating elements applied to the shaft, so that uniformity of agitator spacing may be achieved automatically in perfecting the agitator assembly, resulting in smooth operation of the machine.

It will be noted that the retainers 48 and the agitating elements 8, when assembled, are alternated along the length of the shaft so that each agitating element is held in position upon the shaft by two successive retainers. Also, in effecting the assembly, successive agitating elements are preferably applied so as to extend radially from the shaft in different directions, as, for example, at ninety degree angularity as shown in the drawing Fig. 4, wherein the shaft is illustrated as square in cross-section. The relative angularity of extension of the agitating element arms would, of course, be less if the shaft facets were greater in number, as would be the case if the shaft were hexagonal or octagonal in cross-section.

Figure 3:
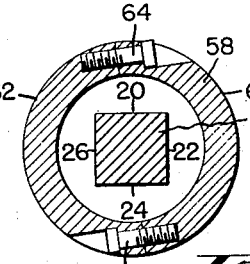
Fig. 3 is a cross-sectional view taken on line 3—3 of Fig. 1, detailing a master retainer which constitutes an element of the invention.

By referring now to Figs. 1 and 3, it will be noted that the assembly includes a master retainer 58 which may be made in two separable halves 60 and 62, held together by screws or other fastening devices 64—64 to be removed for dismounting the master retainer from the shaft. If the master retainer 58 of Fig. 1 is removed, space will be afforded to permit sliding the adjacent agitating element to the left sufficiently to clear its hub from the bore of the adjacent sleeve 48; thereupon, the agitating element may be unhooked from the shaft in the manner suggested at the right in Fig. 4. Once a single agitating element has been so removed from the assembly, any others may likewise be removed for replacement by the mere axial shifting of retainers or sleeves 48 to free the agitator hubs. In order to assure disassembly of the structure as above explained, the master retainer should slightly exceed in length the length of a hub 30. The remaining retainers may be of any desired length greater than the length of a hub, depending upon the amount of space desired between successive agitating elements along the shaft.

As an alternative to providing a separable master retainer such as 58, the tank end wall structure may be provided with an opening 66 large enough to permit shifting of a retainer outwardly therethrough upon removal of bearing 10 and its support block 68. By removing the screws 70, the bearing support member 68 may be slid axially outwardly along the turned end of the shaft, while the shaft is supported by some form of auxiliary jack. By this arrangement, the sleeve or retainer nearest to the tank wall may be shifted to the left, through the opening 66, to permit shifting of the nearest agitating element toward the tank wall and out of the bore of the second retainer, thereby releasing the agitating element for displacement from the shaft. In this alternative construction, the initially displaceable retainer need not be of the separable type indicated at 58, but instead may be a plain sleeve like 48.

In the initial assembly of an agitator structure, a proper number of sleeves such as 48 would be slipped onto the shaft from one end; then, after mounting the shaft in its bearings, the agitating elements may be applied one by one between successive sleeves, the sleeves being shifted axially of the shaft as required, to afford space to accommodate the agitating elements. Upon placing of the final agitating element, for example, the one closest to the tank wall in Fig. 1, the assembly may be completed by applying either a separable retainer such as 58, or a plain retainer such as 48, in accordance with the explanation previously given.

From the foregoing, it should be apparent that initial assembly of the agitator structure is greatly simplified and expedited with the practice herein disclosed, and at any time thereafter any individual agitating element may be removed from the assembly for replacement or repair with little expenditure of time and effort. There are no bolts or screws to break or loosen, with hazardous results as previously mentioned, and by virtue of the sleeve locks requiring no servicing, periodic inspections and shut-downs of the machines are reduced to a minimum or eliminated entirely.

The working areas of the agitating elements shown are subject to modification as desired, and the spacing of agitating elements along the shaft may be varied by the use of sleeve-like retainers in different lengths, or in greater numbers, than herein disclosed. Various other modifications and changes in structural details may be made, within the scope of the appended claims, without departing from the spirit of the invention.

What is claimed is:

1. An agitating element for detachable application to a shaft polygonal in cross-section, the shaft having facets angularly related to one another, said element comprising an arm including a material-working area, and a hub longer than the axial width of the arm, said hub having an outer wall and being channeled longitudinally to provide an open-ended socket having a throat receptive of the shaft, and interior faces in the socket complementary to and registrable with the shaft facets, and a hub retainer slidably surrounding the shaft, said retainer being in the form of a sleeve embracing the outer wall of the outer ends of the hub and closing the throat of the socket.

2. An agitating element for detachable application to a shaft having facets angularly related to one another, said element comprising an arm including a material-working area at one end thereof, and a hub at the other end, said hub having ends which project beyond the axial faces of the arm, said hub having an outer wall and being channeled longitudinally to provide an open-ended socket having a throat receptive of the shaft, and interior faces in the socket complementary to and registrable with the shaft facets, and a hub retainer completely encircling the outer wall of the hub to close the throat of the socket on opposite sides of the arm, said retainer being slidable longitudinally of the hub and said shaft.

3. An agitating element for detachable application to a shaft having facets angularly related to one another, said element comprising an elongate arm including a material-working area and a hub extending beyond and transversely of the arm, the hub having an outer substantially cylindrical wall channeled axially of the hub to provide an open-ended socket having a throat receptive of the shaft, and interior faces in the socket complementary to and registrable with the shaft facets, the direction of extension of the throat being substantially at right angles to the elongate arm, and a hub retainer in the form of a cylindrical sleeve slidable axially of the shaft and about the cylindrical wall of the hub, to encircle the hub and close portions of the throat of the socket.

4. An agitator element comprising an elongate arm including a material-working area, and a transversely disposed hub channeled to provide an open-ended socket having a throat receptive of more than one-half of the perimeter of the shaft, and a displaceable sleeve encircling the hub to close the throat of the socket on one side of the arm.

5. A material-working machine comprising in combination, a tank having an inner wall and a pair of end walls for confining a material to be worked, a shaft extending from one end wall to the other, and means supporting the shaft for rotary movement within the tank, the shaft being polygonal in cross-section to provide facets thereon angularly related to one another, a series of agitating elements removably mounted on the shaft in side-by-side relationship each of said elements comprising a material-working area disposed in close proximity to the inner wall of the tank, and a hub having opposite ends and an outer wall, the hub of each agitating element being channeled to provide an open-ended socket having a throat receptive of the shaft, and interior faces in the socket complementary to and registrable with the shaft facets, and a series of hub retainers each in the form of an open-ended sleeve loosely encircling the shaft, one such sleeve being disposed between adjacent agitating elements upon the shaft, with opposite ends of a sleeve encircling and embracing an end of each of two adjacent agitating elements.

6. The combination as specified in claim 5, wherein alternate sleeves and agitating elements are disposed along the full length of the shaft intermediate the end walls of the tank, and one of said sleeves is separable for lateral bodily dislodgment from the shaft, to provide space along the shaft for shifting any other sleeve off the ends of two adjacent agitating elements for displacement of an agitating element from the shaft.

7. A material-working machine of the class described comprising in combination, a tank having an inner wall and a pair of end walls for confining a material to be worked, a shaft extending from one end wall to the other, and means supporting the shaft for rotary movement within the tank, the shaft being square in cross-section to provide four longitudinal facets thereon angularly related to one another, a series of detachable agitating elements mounted on the shaft in side-by-side relationship each of said elements including a material-working area disposed in close proximity to the inner wall of the tank, and a hub longitudinally channeled to provide a three-walled, open-ended socket having a throat receptive of the shaft, the socket of each agitating element having interior faces complementary to and registrable with three of the shaft facets, and sleeve means closing the throat of each socket to preclude accidental displacement of the hubs of adjacent elements from the shaft, said sleeve means being slidable bodily over the hubs of adjacent agitating elements in spanning and encircling relationship to such hubs.

8. A material-working machine of the class described comprising in combination, a tank having an inner wall and a pair of end walls for confining a material to be worked, a shaft extending between the end walls, and means supporting the shaft for rotary movement within the tank, the shaft being polygonal in cross-section to provide longitudinal facets thereon angularly related to one another, a series of detachable agitating elements on the shaft in side-by-side relationship, each of said elements including an arm having a material-working area disposed in close proximity to the inner wall of the tank, and an elongate hub disposed transversely of the arm, said hub having an outer wall and opposite ends which project beyond the axial faces of their respective arms, the said outer walls being channeled lengthwise of the hub to provide an open-ended socket having a throat receptive of the shaft, and interior faces in the sockets complementary to and registrable with more than half of the shaft facets, and a series of hub retainers loosely encircling the shaft, the retainers and the hubs being alternated along the length of the shaft, each retainer being in the form of an elongate sleeve having opposed open ends slidingly receptive of the ends of adjacent hubs, and successive agitating elements along the shaft being arranged to extend the arms thereof in different directions radially of the shaft.

9. A material-working machine of the class described comprising in combination, a tank having an inner wall and a pair of end walls for confining a material to be worked, a shaft extending between the end walls, and means supporting the shaft for rotary movement within the tank, the shaft being polygonal in cross-section throughout substantially the length of the tank, to provide longitudinal facets thereon angularly related to one another, a series of detachable agitating elements on the shaft in side-by-side relationship, each of said elements including an arm having a material-working area disposed in close proximity to the inner wall of the tank, and an elongate cylindrical hub disposed transversely to the arm, said hub having cylindrical ends at opposite sides of the arm, the hub being channeled lengthwise to provide an open-ended socket having a throat receptive of the shaft, and interior faces in the socket complementary to and registrable with the shaft facets, and a series of hub retainers loosely encircling the shaft, the retainers and the hubs being alternated along the polygonal section of the shaft, each retainer being in the form of an elongate sleeve having opposed open ends slidingly receptive of the ends of adjacent hubs, with the ends of a sleeve abutting the arms of adjacent agitating elements to maintain the hubs thereof in spaced relationship, successive agitating elements along the shaft being arranged to extend the arms thereof in different directions radially of the shaft.

10. A material-working machine of the class described comprising in combination, a tank having an inner wall and a pair of end walls for confining a material to be worked, one of said end walls having an opening therein, a shaft extending from one end wall to the other, and through the opening aforesaid, bearing means supporting the shaft for rotary movement within the tank, one of said bearing means being displaceably mounted upon the tank at said end wall opening, the shaft having a portion polygonal in cross-section to provide facets thereon angularly related to one another, a series of detachable agitating elements mounted in side-by-side relationship on said shaft, each of said agitating elements comprising a material-working area disposed in closed proximity to the inner wall of the tank, and a hub having opposite ends and an outer wall, the hub of each agitating element being channeled to provide an open-ended socket having a throat receptive of the shaft, and interior faces in the socket complementary to and registrable with more than one-half of the shaft facets, a series of hub retainers each in the form of an open-ended sleeve loosely encircling the shaft, one of said sleeves being located upon the shaft immediately adjacent to the shaft bearing, and others of said sleeves being disposed about the shaft between adjacent agitating elements, with opposite ends of said other sleeves each encircling and embracing the ends of two adjacent hubs, the opening in said one end wall of the tank being dimensioned, to pass the one sleeve aforesaid, through the tank wall, upon displacement of the bearing means aforesaid, and thereby afford tolerance along the shaft for axial shifting of the other sleeves to release the hubs of selected agitating elements for detachment from the shaft.

11. A material-working machine of the class described comprising in combination, a tank having an inner wall and a pair of end walls for confining a material to be worked, one of said end walls having an opening therein, a shaft extending through said opening toward the other end wall of the tank, a bearing and a bearing support block mounted at the opening for bodily displacement exteriorly of the tank, said bearing supporting the shaft for rotation in the tank, a series of slidable agitating elements including hubs detachably applied to the shaft interiorly of the tank, a series of cylindrical retainers slidably encircling the hubs and the shaft, the retainers and the agitating elements being alternated along the length of the shaft, with one retainer disposed adjacent to the displaceable bearing support block and dimensioned to pass through the end wall opening upon bodily displacement of said bearing support block and bearing exteriorly of the tank, thereby to afford tolerance along the shaft for axial shifting of selected retainers from proximity with the hubs of the agitating elements, to free said elements for detachment from the shaft.

12. A material-working machine of the class described comprising in combination, a tank having an inner wall and a pair of end walls for confining a material to be worked, a shaft extending from one end wall to the other, and means supporting the shaft for rotary movement within the tank, the shaft being square in cross-section to provide four longitudinal facets thereon angularly related to one another, a series of detachable agitating elements mounted on the shaft in side-by-side relationship, each of said elements including a material-working area disposed in close proximity to the inner wall of the tank, and a hub longitudinally channeled to provide a three-walled, open-ended socket having a throat receptive of the shaft, the socket of each agitating element having interior faces complementary to and registerable with three of the shaft facets, and sleeve means closing the throat of each socket and spanning the hubs of adjacent agitating elements to preclude accidental displacement of the hubs of adjacent elements from the shaft and maintaining the hubs in spaced relationship.

References Cited in the file of this patent

UNITED STATES PATENTS

| | | |
|---|---|---|
| 1,540,547 | Doidge | June 2, 1925 |
| 2,017,116 | Bonnell | Oct. 15, 1935 |
| 2,169,338 | Ditto | Aug. 15, 1939 |
| 2,538,936 | Fazenbaker | Jan. 23, 1951 |